US012661883B2

(12) United States Patent
Suzuki

(10) Patent No.: US 12,661,883 B2
(45) Date of Patent: Jun. 23, 2026

(54) IMAGE FORMING APPARATUS, CORRECTING METHOD, AND NON-TRANSITORY RECORDING MEDIUM

(71) Applicant: Tatsuya Suzuki, Kanagawa (JP)

(72) Inventor: Tatsuya Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 224 days.

(21) Appl. No.: 18/743,627

(22) Filed: Jun. 14, 2024

(65) Prior Publication Data

US 2025/0033351 A1     Jan. 30, 2025

(30) Foreign Application Priority Data

Jul. 28, 2023     (JP) ................................. 2023-123385

(51) Int. Cl.
 *B41J 2/045*          (2006.01)
 *G06T 7/00*          (2017.01)
(52) U.S. Cl.
 CPC ....... *B41J 2/04573* (2013.01); *B41J 2/04586* (2013.01); *G06T 7/001* (2013.01); *G06T 2207/10008* (2013.01); *G06T 2207/30144* (2013.01)
(58) Field of Classification Search
 CPC .. B41J 2/04573; B41J 2/04586; B41J 2/2135; B41J 2/2146; G06T 7/001; G06T 2207/10008; G06T 2207/30144
 See application file for complete search history.

(56) References Cited

U.S. PATENT DOCUMENTS

| | | | |
|---|---|---|---|
| 2015/0091963 A1 | 4/2015 | Yamanaka et al. | |
| 2017/0225494 A1* | 8/2017 | Tokunaga | .............. B41J 11/006 |
| 2017/0266965 A1 | 9/2017 | Gohda et al. | |
| 2018/0270366 A1* | 9/2018 | Sunaoshi | ............... B41J 2/2146 |
| 2020/0376831 A1* | 12/2020 | Tatsuda | .................. B41J 2/2135 |
| 2023/0117336 A1 | 4/2023 | Suzuki et al. | |

FOREIGN PATENT DOCUMENTS

| | | |
|---|---|---|
| JP | 2008-012712 A | 1/2008 |
| JP | 2015-066851 A | 4/2015 |
| JP | 2017-170889 A | 9/2017 |

* cited by examiner

*Primary Examiner* — Sharon Polk
(74) *Attorney, Agent, or Firm* — IPUSA, PLLC

(57)     ABSTRACT

An image forming apparatus includes a discharger and circuitry. The discharger includes liquid-discharge head units to discharge liquid to form an image on a recording medium conveyed in a direction. The circuitry detects displacement in the direction of discharge positions on the recording medium between the liquid-discharge head units depending on a type of the recording medium. The circuitry performs, based on a result of detection of the displacement, a first correction to correct timing of discharge from the liquid-discharge head units to keep the discharge positions of the liquid-discharge head units stable regardless of the type of the recording medium. The circuitry performs, after the first correction, a second correction to correct the timing of discharge from the liquid-discharge head units to align the discharge positions of the liquid-discharge head units, unless the second correction has been completed on the recording medium of another type in past.

5 Claims, 7 Drawing Sheets

FIG. 5A

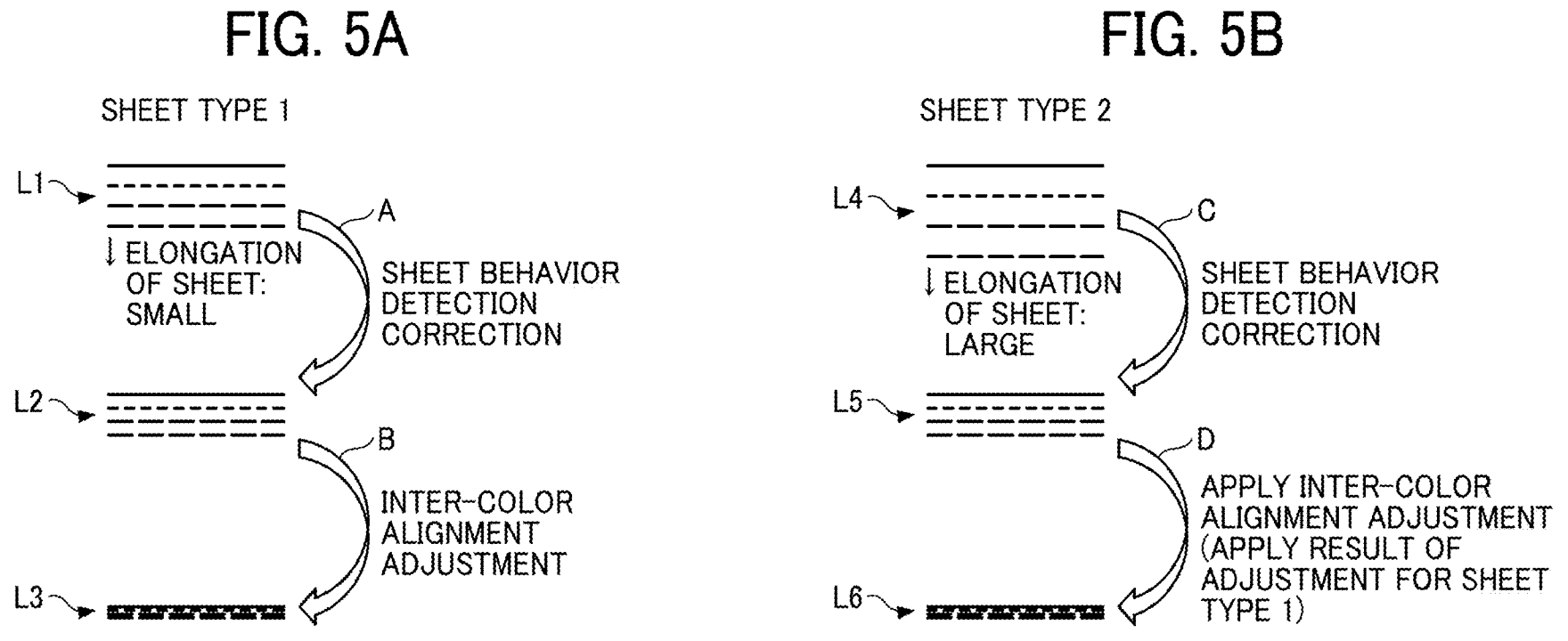

SHEET TYPE 1

L1

↓ ELONGATION OF SHEET: SMALL

A — SHEET BEHAVIOR DETECTION CORRECTION

L2

B — INTER-COLOR ALIGNMENT ADJUSTMENT

SHEET TYPE 2

L4

↓ ELONGATION OF SHEET: LARGE

C — SHEET BEHAVIOR DETECTION CORRECTION

L5

D — APPLY INTER-COLOR ALIGNMENT ADJUSTMENT (APPLY RESULT OF ADJUSTMENT FOR SHEET TYPE 1)

Figure 6:
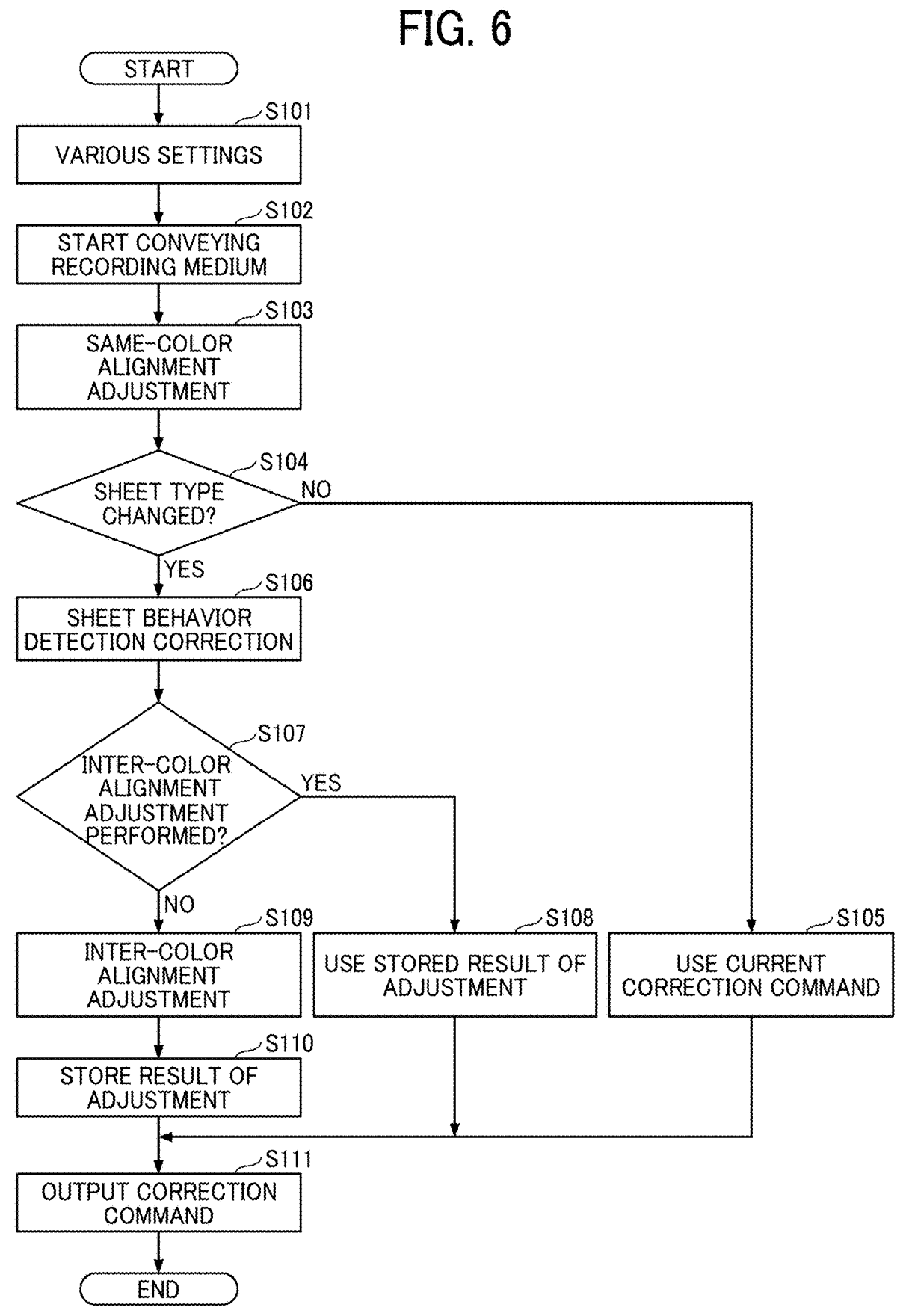

START

S101
VARIOUS SETTINGS

S102
START CONVEYING RECORDING MEDIUM

S103
SAME-COLOR ALIGNMENT ADJUSTMENT

S104
SHEET TYPE CHANGED? — NO

YES

S106
SHEET BEHAVIOR DETECTION CORRECTION

S107
INTER-COLOR ALIGNMENT ADJUSTMENT PERFORMED? — YES

NO

S109
INTER-COLOR ALIGNMENT ADJUSTMENT

S108
USE STORED RESULT OF ADJUSTMENT

S105
USE CURRENT CORRECTION COMMAND

S110
STORE RESULT OF ADJUSTMENT

S111
OUTPUT CORRECTION COMMAND

END

IMAGE FORMING APPARATUS, CORRECTING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2023-123385, filed on Jul. 28, 2023, in the Japan Patent Office, the entire disclosure of which is hereby incorporated by reference herein.

BACKGROUND

Technical Field

The present disclosure relates to an image forming apparatus, a correcting method performed by an image forming apparatus, and a non-transitory recording medium.

Related Art

For image forming apparatuses including line heads, a technique for enhancing the printing accuracy by adjusting the alignment of the line heads is known.

SUMMARY

According to an embodiment of the present disclosure, an image forming apparatus includes a discharger and circuitry. The discharger includes a plurality of liquid-discharge head units to discharge liquid to form an image on a recording medium conveyed in a direction. The circuitry detects displacement in the direction of discharge positions on the recording medium between the plurality of liquid-discharge head units depending on a type of the recording medium. The circuitry performs, based on a result of detection of the displacement, a first correction to correct timing of discharge from the plurality of liquid-discharge head units to keep the discharge positions of the plurality of liquid-discharge head units stable regardless of the type of the recording medium. The circuitry performs, after the first correction, a second correction to correct the timing of discharge from the plurality of liquid-discharge head units to align the discharge positions of the plurality of liquid-discharge head units, unless the second correction has been completed on the recording medium of another type in past.

According to an embodiment of the present disclosure, a correcting method performed by an image forming apparatus, which includes a discharger including a plurality of liquid-discharge head units to discharge liquid to form an image on a recording medium conveyed in a direction, includes: detecting displacement in the direction of discharge positions on the recording medium between the plurality of liquid-discharge head units depending on a type of the recording medium; performing, based on a result of detection of the displacement, a first correction to correct timing of discharge from the plurality of liquid-discharge head units to keep the discharge positions of the plurality of liquid-discharge head units stable regardless of the type of the recording medium; and performing, after the first correction, a second correction to correct the timing of discharge from the plurality of liquid-discharge head units to align the discharge positions of the plurality of liquid-discharge head units, unless the second correction has been completed on the recording medium of another type in past.

According to an embodiment of the present disclosure, a non-transitory recording medium stores a plurality of instructions which, when executed by one or more processors of an image forming apparatus, causes the one or more processors to perform a correcting method. The image forming apparatus includes a discharger including a plurality of liquid-discharge head units to discharge liquid to form an image on a recording medium conveyed in a direction. The method includes: detecting displacement in the direction of discharge positions on the recording medium between the plurality of liquid-discharge head units depending on a type of the recording medium; performing, based on a result of detection of the displacement, a first correction to correct timing of discharge from the plurality of liquid-discharge head units to keep the discharge positions of the plurality of liquid-discharge head units stable regardless of the type of the recording medium; and performing, after the first correction, a second correction to correct the timing of discharge from the plurality of liquid-discharge head units to align the discharge positions of the plurality of liquid-discharge head units, unless the second correction has been completed on the recording medium of another type in past.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 5A and 5B are schematic diagrams each illustrating an overview of the discharge-timing correction control;

FIG. 6 is a flowchart of a discharge-timing correction control according to an embodiment of the present disclosure.

Figure 1:
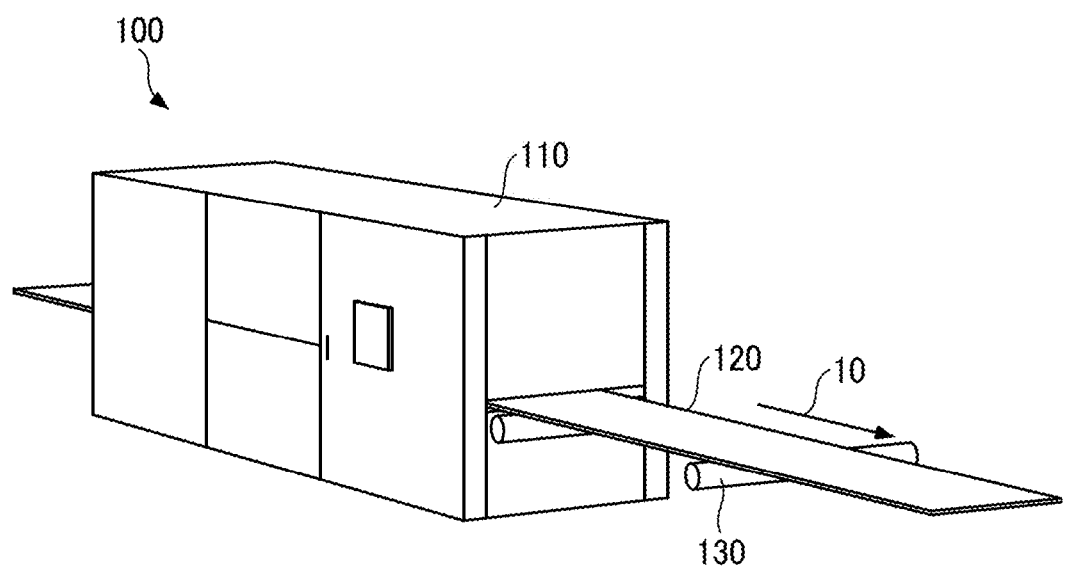
FIG. 1 is a perspective view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below.

As used herein, the singular forms "a," "an," and "the" are intended to include the plural forms as well, unless the context clearly indicates otherwise. The term "connected/coupled" includes both direct connections and connections in which there are one or more intermediate connecting elements.

For the sake of simplicity, like reference signs denote like elements such as parts and materials having the same functions, and redundant descriptions thereof are omitted unless otherwise required.

In the following description, suffixes Y, M, C, and K denote colors of yellow, magenta, cyan, and black, respectively. To simplify the description, these suffixes are omitted unless necessary.

Configuration of Image Forming Apparatus

Figure 2:
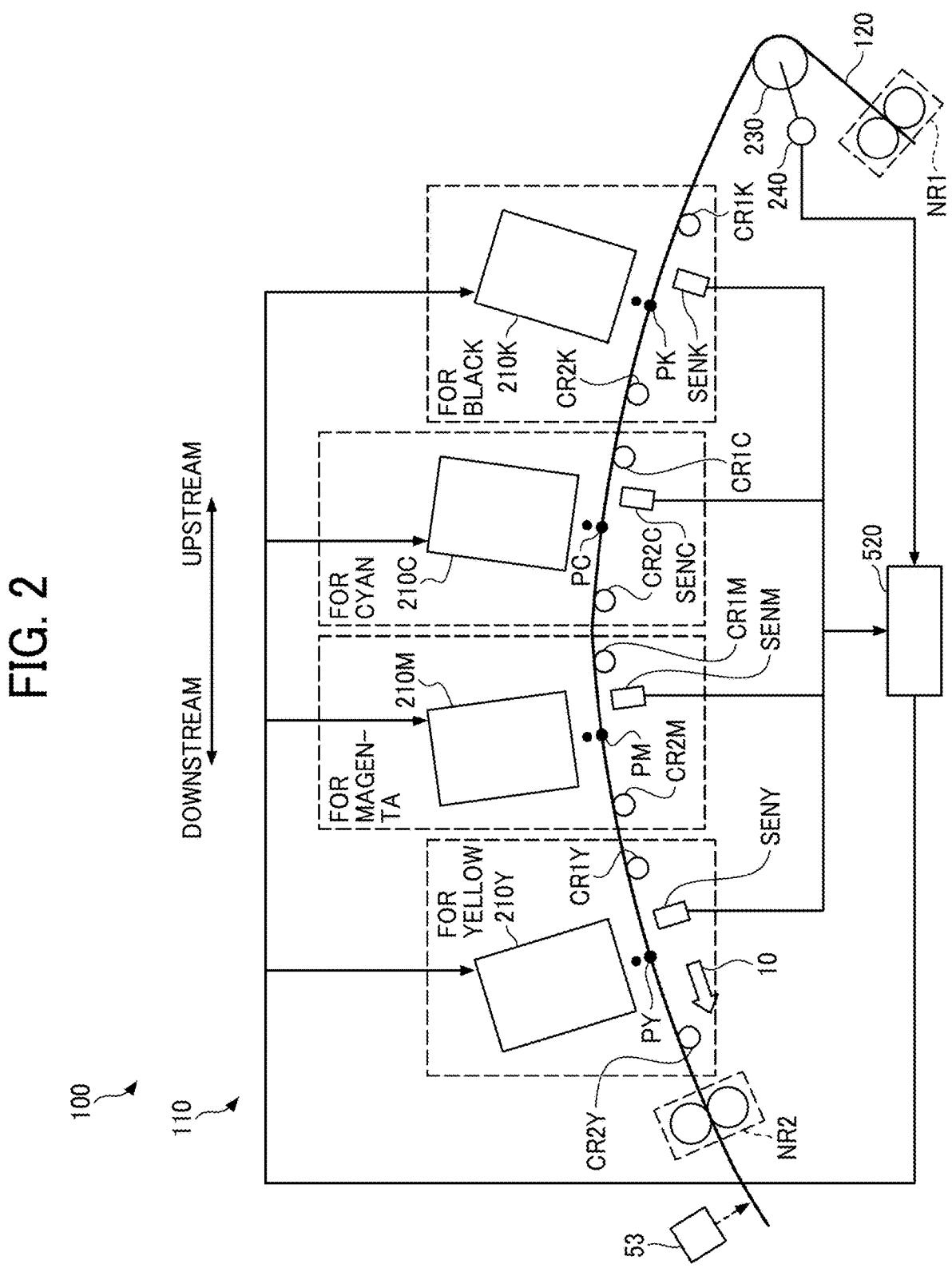
FIG. 2 is a diagram illustrating a configuration of a discharger included in the image forming apparatus of FIG. 1.

Initially with reference to FIGS. 1 and 2, a description is given of an image forming apparatus 100 according to an embodiment of the present disclosure.

FIG. 1 is a perspective view of the image forming apparatus 100 according to the present embodiment.

The image forming apparatus 100 is a so-called inkjet image forming apparatus that forms an image by discharging liquid onto a conveyed object. The liquid to be discharged is a recording liquid such as an aqueous or oily ink.

The conveyed object is, for example, a recording medium. In the example illustrated in FIG. 1, the image forming apparatus 100 forms an image by discharging liquid onto a web 120, which is an example of the recording medium conveyed by, for example, a roller 130. The web 120 is, for example, a so-called continuous paper print medium. In other words, the web 120 is, for example, a roll-shaped sheet that can be wound. Thus, the image forming apparatus 100 is a so-called production printer. A description is given below of an example in which the roller 130 adjusts the tension of the web 120 and the web 120 is conveyed in the illustrated direction, which is referred to as a conveyance direction 10 in the following description.

In this example, the image forming apparatus 100 is an inkjet printer that forms an image at a predetermined place on the web 120 by discharging inks of four colors: black (K), cyan (C), magenta (M), and yellow (Y). The image forming apparatus 100 includes a discharger 110 that discharges such a plurality of inks onto the web 120.

FIG. 2 is a diagram illustrating a configuration of the discharger 110 according to the present embodiment.

As illustrated in FIG. 1, the discharger 110 of the image forming apparatus 100 includes four liquid-discharge head units 210 to discharge the inks of four colors.

Each of the liquid-discharge head units 210 discharges liquid of the corresponding color onto the web 120 conveyed in the conveyance direction 10. The web 120 is conveyed by, for example, two pairs of nip rollers and a roller 230. In the following description, one of the two pairs of nip rollers disposed upstream from the liquid-discharge head units 210 in the conveyance direction 10 is referred to as "first nip rollers NR1." The other one of the two pairs of nip rollers disposed downstream from the first nip rollers NR1 and the liquid-discharge head units 210 in the conveyance direction 10 is referred to as "second nip rollers NR2." As illustrated in FIG. 2, the nip rollers rotate while sandwiching the conveyed object such as the web 120. Thus, the first nip rollers NR1, the second nip rollers NR2, and the roller 230 are, for example, mechanisms for conveying the object such as the web 120 in a predetermined direction.

The recording medium such as the web 120 is preferably long. Specifically, the recording medium is preferably longer than the distance between the first nip rollers NR1 and the second nip rollers NR2. The recording medium is not limited to the web 120. Alternatively, the recording medium may be, for example, a sheet which is folded and stored, that is, a so-called "Z paper."

In the example illustrated in FIG. 2, the liquid-discharge head units 210 are disposed in the order of black (K), cyan (C), magenta (M), and yellow (Y) from upstream to downstream in the conveyance direction 10. Specifically, the liquid-discharge head unit 210 for black (K) is disposed most upstream in the conveyance direction 10 and is referred to as a "black liquid-discharge head unit 210K" in the following description. The liquid-discharge head unit 210 for cyan (C) is next to the black liquid-discharge head unit 210K in the conveyance direction 10 and is referred to as a "cyan liquid-discharge head unit 210C" in the following description. The liquid-discharge head unit 210 for magenta (M) is next to the cyan liquid-discharge head unit 210C in the conveyance direction 10 and is referred to as a "magenta liquid-discharge head unit 210M" in the following description. The liquid-discharge head unit 210 for yellow (Y) is disposed most downstream in the conveyance direction 10 and is referred to as a "yellow liquid-discharge head unit 210Y" in the following description.

Each of the liquid-discharge head units 210 discharges ink of the corresponding color to a predetermined place on the web 120 based on, for example, image data. The position to which the ink is discharged is referred to as a landing position in the following description. The landing position is substantially the same as the position at which the liquid discharged from the liquid-discharge head unit 210 lands on the recording medium. In other words, the landing position is, for example, directly below the liquid-discharge head unit 210. A description is given below of an example in which the landing position is a processing position subjected to the processing performed by the liquid-discharge head unit 210.

In this example, the black ink is discharged to the landing position for the black liquid-discharge head unit 210K. The landing position for the black liquid-discharge head unit 210K is referred to as a "black landing position PK" in the following description. Similarly, the cyan ink is discharged to the landing position for the cyan liquid-discharge head unit 210C. The landing position for the cyan liquid-discharge head unit 210C is referred to as a "cyan landing position PC" in the following description. The magenta ink is discharged to the landing position for the magenta liquid-discharge head unit 210M. The landing position for the magenta liquid-discharge head unit 210M is referred to as a "magenta landing position PM" in the following description. The yellow ink is discharged to the landing position for the yellow liquid-discharge head unit 210Y. The landing position for the yellow liquid-discharge head unit 210Y is referred to as a "yellow landing position PY" in the following description.

The time when each of the liquid-discharge head units 210 discharges ink (i.e., the timing of ink discharge from each of the liquid-discharge head units 210) is controlled by a controller 520 connected to the liquid-discharge head units 210.

A plurality of rollers is disposed for each of the liquid-discharge head units 210. As illustrated in FIG. 2, the rollers are disposed upstream and downstream across the corresponding liquid-discharge head unit 210 in the conveyance direction 10. In the example illustrated in FIG. 2, the rollers include a first roller and a second roller for each of the liquid-discharge head units 210. The first roller is disposed upstream from each of the liquid-discharge head units 210. The second roller is disposed downstream from each of the liquid-discharge head units 210. The first roller and the second roller disposed as described above reduce so-called "fluttering" at each landing position. The first roller and the second roller are driven rollers. Alternatively, the first roller and the second roller may be rotationally driven by, for example, a motor.

The first roller as an example of a first support and the second roller as an example of a second support may not be rotators such as driven rollers. In other words, the first roller and the second roller may be any supports that support the conveyed object. For example, the first support and the second support may be pipes or shafts having a circular cross-section. Alternatively, the first support and the second support may be, for example, curved plates having an arc portion that contacts the conveyed object. A description is given below of an example in which the first support is the first roller and the second support is the second roller.

Specifically, the first roller for black is disposed to convey the web 120 to the black landing position PK so that the black ink is discharged onto a predetermined place on the web 120. The first roller for black is referred to as a "black first roller CR1K" in the following description. By contrast, the second roller for black is disposed to convey the web 120 downstream from the black landing position PK. The second roller for black is referred to as a "black second roller CR2K" in the following description. Similarly, the first roller for cyan and the second roller for cyan are disposed for the cyan liquid-discharge head unit 210C. The first roller for cyan and the second roller for cyan are respectively referred to as a "cyan first roller CR1C" and a "cyan second roller CR2C" in the following description. The first roller for magenta and the second roller for magenta are disposed for the magenta liquid-discharge head unit 210M. The first roller for magenta and the second roller for magenta are respectively referred to as a "magenta first roller CR1M" and a "magenta second roller CR2M" in the following description. The first roller for yellow and the second roller for yellow are disposed for the yellow liquid-discharge head unit 210Y. The first roller for yellow and the second roller for yellow are respectively referred to as a "yellow first roller CR1Y" and a "yellow second roller CR2Y" in the following description.

Although the liquid-discharge head units 210 include four heads in the example illustrated in FIG. 2, the liquid-discharge head units 210 may include a plurality of heads other than four heads.

For each of the liquid-discharge head units 210, a sensor as an example of a detector is disposed to detect the position of the recording medium, the speed of movement of the recording medium, the amount of movement of the recording medium, or a combination thereof.

Preferably, the sensor is, for example, an optical sensor using light such as laser or infrared rays. The optical sensor may be, for example, a charge-coupled device (CCD) camera or a complementary metal oxide semiconductor (CMOS) camera. Further, the optical sensor is preferably a global shutter. As compared with, for example, a rolling shutter, the global shutter as the optical sensor can reduce so-called image misalignment caused by the difference in shutter timing when the speed of movement is relatively high.

Specifically, a sensor for black is disposed for the black liquid-discharge head unit 210K. The sensor for black is referred to as a "black sensor SENK" in the following description. Similarly, a sensor for cyan is disposed for the cyan liquid-discharge head unit 210C. The sensor for cyan is referred to as a "cyan sensor SENC" in the following description. A sensor for magenta is disposed for the magenta liquid-discharge head unit 210M. The sensor for magenta is referred to as a "magenta sensor SENM" in the following description. A sensor for yellow is disposed for the yellow liquid-discharge head unit 210Y. The sensor for yellow is referred to as a "yellow sensor SENY" in the following description. In the following description, the black sensor SENK, the cyan sensor SENC, the magenta sensor SENM, and the yellow sensor SENY may be collectively referred to as "sensor SEN" or "sensors SEN."

The sensor SEN for each of the liquid-discharge head units 210 can acquire the coordinate information of the web 120 for the corresponding liquid-discharge head unit 210. Each of the sensors SEN outputs the acquired coordinate information of the web 120 to the controller 520.

In the present embodiment, the roller 230 disposed upstream from the liquid-discharge head units 210 in the conveyance direction 10 includes an encoder 240. The encoder 240 is an example of a moving amount measurement unit that measures the amount of movement of the web 120 in the conveyance direction 10. The encoder 240 is coupled to, for example, a rotary shaft of the roller 230. The encoder 240 detects the amount of rotation of the roller 230 and outputs the detected amount of rotation to the controller 520. The controller 520 can acquire the positional information of the web 120 in the conveyance direction 10 based on the result of detection performed by the encoder 240.

The controller 520 implements a technique for ascertaining the displacement of the web 120 between the heads for different colors based on the coordinate information of the web 120 acquired from the sensors SEN and the positional information of the web 120 acquired from the encoder 240. In the present embodiment, this technique is referred to as "sheet behavior detection." For details of the sheet behavior detection, for example, the method described in Japanese Patent No. 7000687 corresponding to United States Patent Application Publication No. 2017/0266965, which is incorporated by reference herein, can be referred to. In this method, the amount of misalignment in the timing of ink discharge from each of the liquid-discharge head units 210 is calculated based on the information of the position of the web 120, the speed of movement of the web 120, the amount of movement of the web 120, or a combination thereof at the position of the sensor SEN for each of the liquid-discharge head units 210. This "amount of misalignment" corresponds to the "displacement of the web 120 between the heads for different colors" in the sheet behavior detection.

In the present embodiment, each of the liquid-discharge head units 210 includes a plurality of nozzle arrays (in this case, four nozzle arrays) aligned in the main scanning direction and in a specific order in the conveyance direction 10. The "displacement of the web 120 between the heads for different colors" that can be ascertained by the above-described sheet behavior detection means the amount of misalignment in the sub-scanning direction (i.e., the conveyance direction 10) of the actual landing positions PK, PC, PM, and PY of the discharged inks of the four colors on the web 120 when the timing of discharge is controlled such that the inks are discharged from the specific nozzle arrays of the liquid-discharge head units 210 to the same predetermined place on the web 120.

The controller 520 can perform sheet behavior detection correction. Specifically, the controller 520 can correct the timing of discharge from each head such that the discharge positions are aligned to the same position between the different colors on the sheet, based on the displacement of the sheet ascertained by the sheet behavior detection. The sheet behavior detection correction eliminates the influence of, for example, the difference in the amount of elongation due to the difference in the type of recording media, thus equalizing the amount of misalignment of the discharge positions between the different colors regardless of the type of recording media. In the present embodiment, such sheet behavior detection correction may be referred to as "first correction." For details of the sheet behavior detection correction, for example, the method described in Japanese Patent No. 7000687, which is incorporated by reference herein, can be referred to. In this method, the amount of misalignment in the timing of ink discharge from each of the liquid-discharge head units 210 is calculated as described above, and the timing of ink discharge from the downstream head in the conveyance direction 10 is adjusted to reduce the amount of misalignment between two adjacent heads.

In particular, in the present embodiment, the controller 520 firstly detects the displacement in the conveyance direction 10 of the discharge positions on the web 120 between the liquid-discharge head units 210K, 210C, 210M, and 210Y depending on the type of the web 120. Based on the result of detection of the displacement, the controller 520 performs the sheet behavior detection correction (first correction) to correct the timing of discharge from each of the liquid-discharge head units 210 to keep the discharge positions of the liquid-discharge head units 210 stable regardless of the type of the web 120.

Secondly, after performing the sheet behavior detection correction, the controller 520 performs inter-color alignment adjustment (second correction) to correct the timing of discharge from the liquid-discharge head units 210 to align the discharge positions of the liquid-discharge head units 210K, 210C, 210M, and 210Y.

Further, in a case where the inter-color alignment adjustment has been completed on the recording medium of another type in the past, the controller 520 does not perform the inter-color alignment adjustment. Instead, the controller 520 uses the past result of adjustment to generate a correction command and outputs the correction command to the liquid-discharge head units 210. The details of a discharge-timing correction control performed by the controller 520 on the liquid-discharge head units 210 (i.e., how the controller 520 controls the correction of timing of discharge from the liquid-discharge head units 210) will be described later with reference to FIG. 3 and the subsequent drawings.

A scanner 53 is disposed downstream from the liquid-discharge head units 210 of the discharger 110 in the conveyance direction 10. The scanner 53 reads dots discharged onto the web 120 by the liquid-discharge head units 210 and outputs the information on the result of reading to the controller 520. The controller 520 can adjust the timing of discharge from each head of the liquid-discharge head units 210 based on the information acquired from the scanner 53 on the result of reading of the dots discharged onto the web 120.

Discharge-Timing Correction Control

Referring to FIGS. 3 to 6, a description is given below of the discharge-timing correction control according to the present embodiment.

Figure 3:
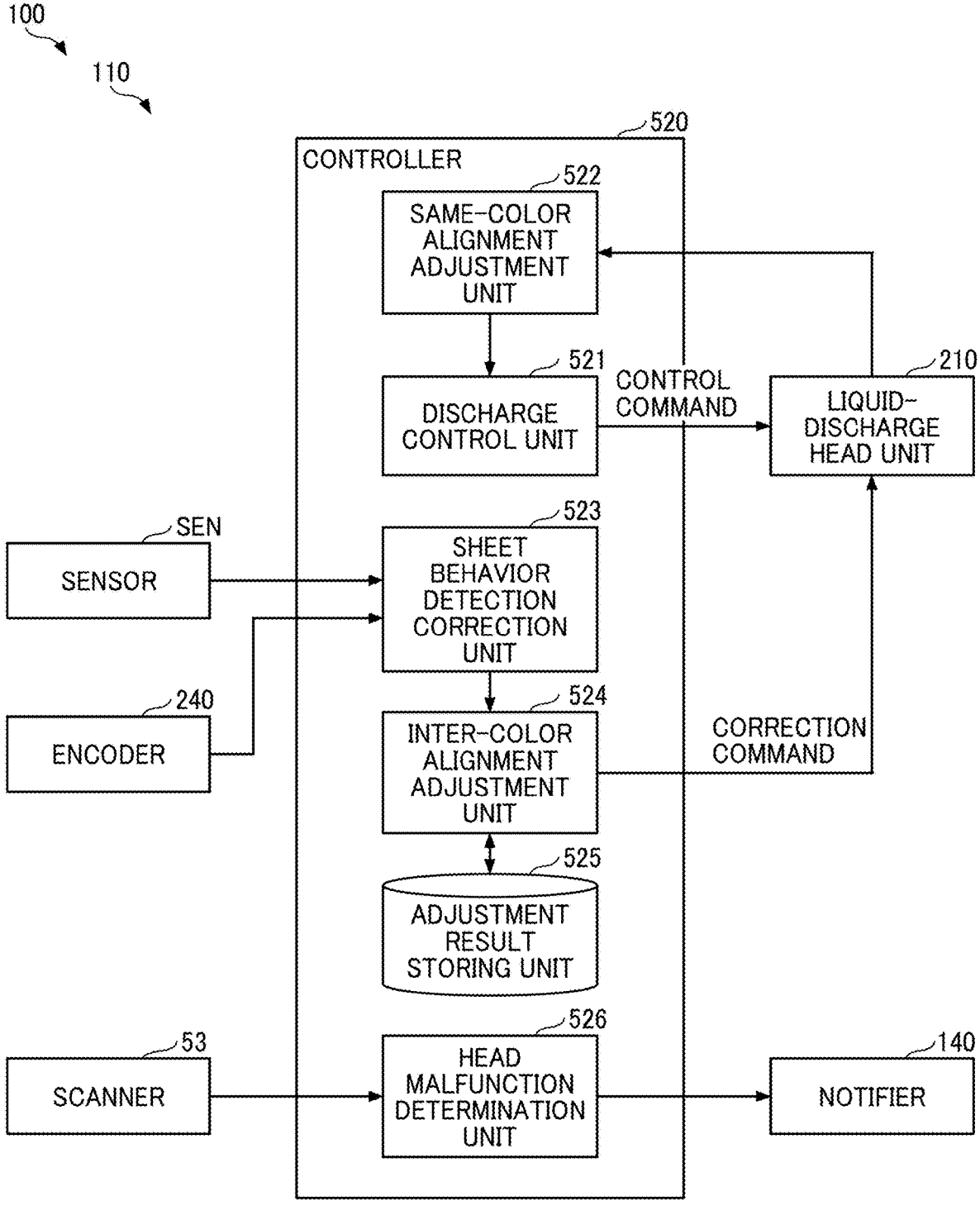
FIG. 3 is a functional block diagram of a controller related to a discharge-timing correction control.

FIG. 3 is a functional block diagram of the controller 520 related to the discharge-timing correction control.

As illustrated in FIG. 3, the controller 520 includes, as functions (functional units) related to the discharge-timing correction control, a discharge control unit 521, a same-color alignment adjustment unit 522, a sheet behavior detection correction unit 523 (first correction unit), an inter-color alignment adjustment unit 524 (second correction unit), and an adjustment result storing unit 525.

The discharge control unit 521 controls the operation of the discharger 110 of the image forming apparatus 100. The discharge control unit 521 generates a control command for forming an image corresponding to image information on the web 120 based on the image information input from, for example, the outside of the image forming apparatus 100. The discharge control unit 521 outputs the generated control command to one or more components of the liquid-discharge head units 210.

The same-color alignment adjustment unit 522 performs alignment adjustment of each head, for each of the liquid-discharge head units 210K, 210C, 210M, and 210Y, that is, for each liquid-discharge head unit of the same color. The alignment adjustment performed by the same-color alignment adjustment unit 522 includes, for example, three processes: (1) analysis of the result of discharge, (2) calculation of the timing of discharge, and (3) feedback of the timing to a nozzle drive circuit.

In other words, the same-color alignment adjustment unit 522 performs the alignment adjustment of the same color based on the information on the result of discharge from the liquid-discharge head units 210K, 210C, 210M, and 210Y. The same-color alignment adjustment unit 522 then provides the information on the result of adjustment to the discharge control unit 521. The discharge control unit 521 adjusts the control command to be output to each liquid-discharge head unit 210 based on the information on the result of adjustment input from the same-color alignment adjustment unit 522. As a result, the discharge control unit 521 can perform feedback control for each same-color unit of the liquid-discharge head units 210K, 210C, 210M, and 210Y.

The sheet behavior detection correction unit 523 performs sheet behavior detection correction (first correction) to correct the timing of discharge from each of the liquid-discharge head units 210 to keep the discharge positions of the liquid-discharge head units 210 stable regardless of the type of the web 120, based on the coordinate information of the web 120 acquired from the sensors SEN and the positional information of the web 120 acquired from the encoder 240. The sheet behavior detection correction unit 523 outputs the information of the discharge positions of the liquid-discharge head units 210 after the sheet behavior detection correction is performed to the inter-color alignment adjustment unit 524.

The inter-color alignment adjustment unit 524 performs inter-color alignment adjustment (second correction) to correct the timing of discharge from the liquid-discharge head units 210 to align the discharge positions of the liquid-discharge head units 210K, 210C, 210M, and 210Y, based on the information of the discharge positions of the liquid-discharge head units 210 after the sheet behavior detection correction input from the sheet behavior detection correction unit 523. Based on the result of the inter-color alignment adjustment, the inter-color alignment adjustment unit 524 generates the correction command for correcting the timing of discharge from each of the liquid-discharge head units 210K, 210C, 210M, and 210Y. The inter-color alignment adjustment unit 524 outputs the generated correction command to one or more components of the liquid-discharge head units 210.

The inter-color alignment adjustment unit 524 outputs the information on the result of adjustment to the adjustment result storing unit 525. The information on the result of adjustment includes, for example, the information of the correction command output to the liquid-discharge head unit 210.

The adjustment result storing unit 525 stores the information on the result of adjustment of the inter-color alignment adjustment (second correction) performed by the inter-color alignment adjustment unit 524.

In particular, in the present embodiment, the inter-color alignment adjustment unit 524 does not perform the inter-color alignment adjustment in the current operation in a case where the information on the result of adjustment is stored in the adjustment result storing unit 525, that is, in a case where the inter-color alignment adjustment (second correction) has been already performed in the past printing operation. In this case, the inter-color alignment adjustment unit 524 uses, for example, the information on the result of adjustment stored in the adjustment result storing unit 525 to generate and output the correction command.

Figure 4:
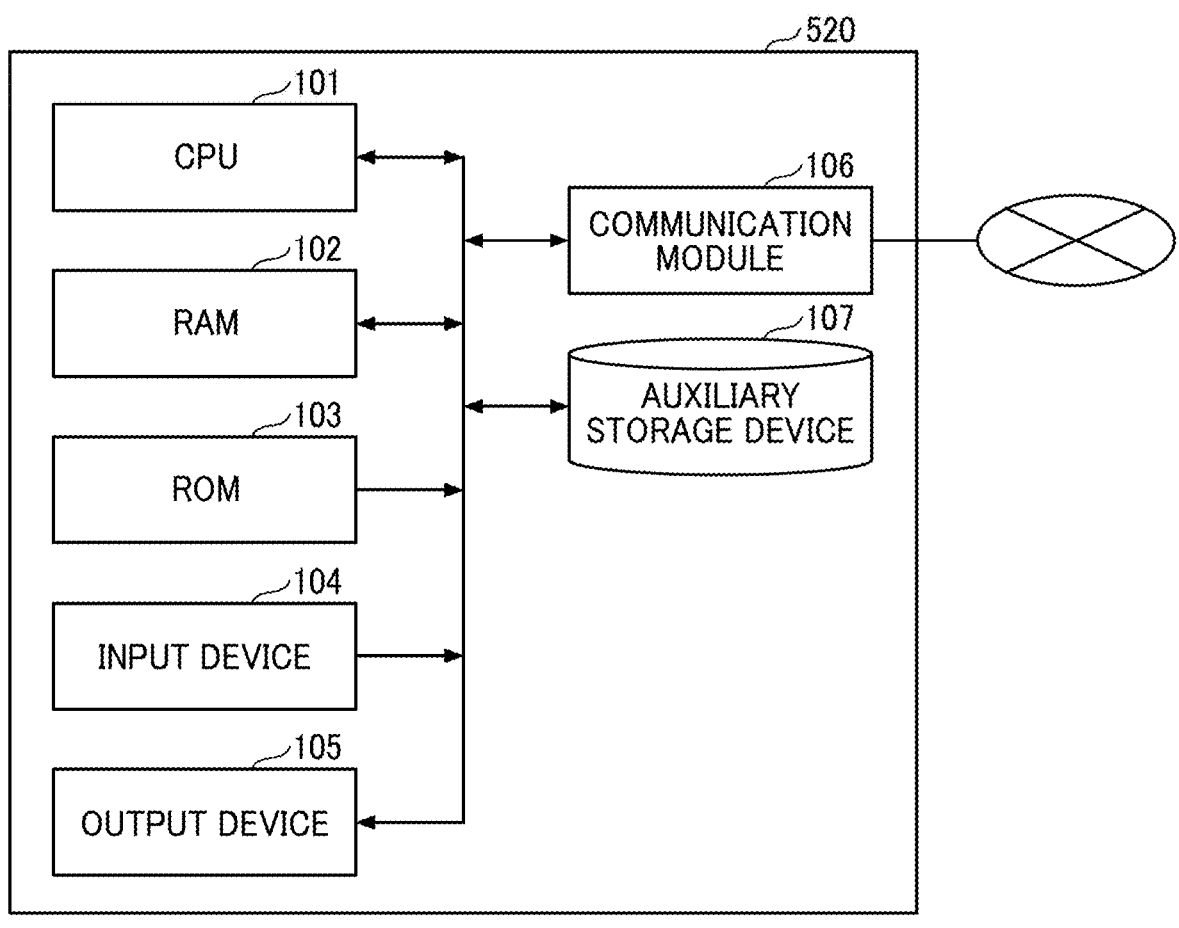
FIG. 4 is a diagram illustrating a hardware configuration of the controller of FIG. 3.

FIG. 4 is a diagram illustrating a hardware configuration of the controller 520.

As illustrated in FIG. 4, the controller 520 can be physically a computer device or a circuit board including, for example, a central processing unit (CPU) 101, a random-access memory (RAM) 102 and a read-only memory (ROM) 103 as main storage devices, an input device 104 such as a keyboard or a mouse, an output device 105 such as a display, a communication module 106 as a data transmission device such as a network card, and an auxiliary storage device 107.

The functions of the controller 520 described above with reference to FIG. 3 are implemented by reading predetermined computer software on hardware such as the CPU 101 or the RAM 102 to operate, for example, the communication module 106, the input device 104, and the output device 105 under the control of CPU 101 and by reading and writing data from and in the RAM 102 or the auxiliary storage device 107. The adjustment result storing unit 525 among the functional units of the controller 520 can be implemented by a part of the storage devices such as the RAM 102 or the auxiliary storage device 107 of the controller 520.

FIGS. 5A and 5B are schematic diagrams each illustrating an overview of the discharge-timing correction control.

Specifically, FIG. 5A illustrates an overview of a procedure of the discharge-timing correction control when the web 120 of sheet type 1 is used as a recording medium. By contrast, FIG. 5B illustrates an overview of a procedure of the discharge-timing correction control when the web 120 of sheet type 2 different from the sheet type 1 is used as a recording medium after the correction control is performed using the web 120 of sheet type 1. Each of FIGS. 5A and 5B illustrates a discharge line for each color along the main scanning direction when the control is performed to discharge inks of different colors to the same position on the recording medium. In each of FIGS. 5A and 5B, the solid line, the broken line, the one-dot chain line, and the two-dot chain line respectively indicate a black discharge line, a cyan discharge line, a magenta discharge line, and a yellow discharge line. In the following description, the discharge lines of the four colors at the same time are collectively referred to as line groups L1 to L6.

In FIG. 5A, first, the timing of discharge is adjusted between the nozzles for the sheet type 1. At this time, as in the line group L1, there is no difference in the timing of discharge for the same color, whereas there is a difference in the timing of discharge between the four colors together with an influence of elongation and contraction of the sheet. In the example of FIGS. 5A and 5B, the amount of elongation of the sheet of sheet type 1 is relatively smaller than that of sheet type 2. The amount of elongation of the sheet is generated to accurately form an image on the recording medium by applying tension to the recording medium in the conveyance direction 10 to stretch and spread the recording medium and eliminate wrinkles and slack when the recording medium passes through the discharger 110 in the image forming apparatus 100.

As indicated by arrow A in FIG. 5A, the correction based on the sheet behavior detection (the sheet behavior detection correction) is performed to eliminate the influence of elongation and contraction of the sheet as in the line group L2.

Further, as indicated by arrow B in FIG. 5A, the alignment adjustment between different colors (the inter-color alignment adjustment) is performed in the state described above to correct the difference in the timing of discharge between the four colors and the discharge lines of the four colors overlap each other at the same position on the recording medium as in the line group L3. Although FIG. 5A illustrates, as the line group L3, the discharge lines not overlapping each other such that the individual discharge lines of the four colors can be visually recognized, the discharge lines of the four colors in the line group L3 completely overlap each other in practice.

A description is given below of a case where the recording medium is replaced with a recording medium of sheet type 2 as illustrated in FIG. 5B.

First, as in the case of sheet type 1 described above, the timing of discharge is adjusted between the nozzles for the sheet type 2. At this time, as in the line group L4, there is no difference in the timing of discharge for the same color, whereas there is a difference in the timing of discharge between the four colors together with an influence of elongation and contraction of the sheet. Since the amount of elongation of the sheet of sheet type 2 is relatively larger than the sheet type 1 as described above, the amount of misalignment of the discharge lines of the four colors in the line group L4 is larger than that in the line group L1 illustrated in FIG. 5A.

As indicated by arrow C in FIG. 5B, the correction based on the sheet behavior detection (the sheet behavior detection correction) is performed in the state described above to eliminate the influence of elongation and contraction of the sheet as in the line group L5. The amount of misalignment of the discharge lines of the four colors in the line group L5 is the same as that in the line group L2 illustrated in FIG. 5A. This is because the line groups L2 and L5 are both acquired after the sheet behavior detection correction, and therefore, there is no influence of the difference in the amount of elongation between the sheet types 1 and 2.

As indicated by arrow B in FIG. 5A, the inter-color alignment adjustment has already been performed at the time of adjustment of the sheet of sheet type 1. Since the line groups L2 and L5 have the same amount of misalignment between the four colors, the inter-color alignment adjustment from the line group L5 to the line group L6 is not necessary. For this reason, as indicated by arrow D in FIG. 5B, the result of adjustment for the sheet type 1 is applied, instead of the inter-color alignment adjustment being newly performed for the sheet type 2, to acquire the line group L6 as a result of correction, like the line group L3 after the final correction in FIG. 5A. Although FIG. 5B illustrates, as the line group L6, the discharge lines not overlapping each other such that the individual discharge lines of the four colors can be visually recognized, the discharge lines of the four colors in the line group L6 completely overlap each other in practice.

Although the alignment adjustment has been typically performed for the same color and between different colors each time the sheet type is changed, the first inter-color alignment adjustment remains and the subsequent inter-color alignment adjustments are omitted by the discharge-timing correction control according to the present embodiment. FIG. 6 is a flowchart of the discharge-timing correction control according to the present embodiment.

In step S101, various settings are performed. The settings performed in this step include, for example, engine running, head voltage adjustment, main-scanning adjustment, the adjustment of the sensors SEN (the adjustment of control parameters such as the amount of light), and filling of the image forming apparatus 100 with a recording medium (web 120) to be subjected to discharge-timing correction control. The settings in this step may be automatically performed by the discharge control unit 521 of the controller 520, may be manually performed by an operator, or may be performed by the controller 520 in response to the adjustment information input through the input device 104 of the image forming apparatus 100.

In step S102, the rollers described above start conveying the recording medium and the discharger 110 starts the ink discharge operation.

In step S103, the same-color alignment adjustment unit 522 performs the same-color alignment adjustment. The same-color alignment adjustment includes, for example, three processes: (1) analysis of the result of discharge, (2) calculation of the timing of discharge, and (3) feedback of the timing to the nozzle drive circuit.

In step S104, the controller 520 determines whether the type of the web 120 (i.e., the type of recording medium) has been changed since the previous operation (e.g., the execution of the previous discharge-timing correction control). The determination in this step may be automatically performed by, for example, the controller 520, or may be performed by the controller 520 in response to the information of the sheet type input by an operator through, for example, the input device 104 of the image forming apparatus 100.

When the sheet type has not been changed (NO in step S104), the process proceeds to step S105. In step S105, the sheet behavior detection correction unit 523 and the inter-color alignment adjustment unit 524 use the current correction command.

By contrast, when the sheet type has been changed (YES in step S104), the process proceeds to step S106. In step S106, the sheet behavior detection correction unit 523 performs the sheet behavior detection correction on the web 120 of a new sheet type after the change.

In step S107, the inter-color alignment adjustment unit 524 determines whether the inter-color alignment adjustment has been performed. The inter-color alignment adjustment unit 524 can determine that the adjustment has been performed when, for example, referring to the adjustment result storing unit 525 and the information on the result of adjustment is stored.

When the inter-color alignment adjustment has been performed (YES in step S107), the process proceeds to step S108. In step S108, the inter-color alignment adjustment unit 524 uses the result of adjustment stored in the adjustment result storing unit 525 and omits the inter-color alignment adjustment in the current operation.

By contrast, when the inter-color alignment adjustment has not been performed (NO in step S107), the process proceeds to step S109. In step S109, the inter-color alignment adjustment unit 524 performs the inter-color alignment adjustment.

In step S110, the inter-color alignment adjustment unit 524 stores the result of adjustment acquired in step S109 in the adjustment result storing unit 525.

In step S111, the inter-color alignment adjustment unit 524 generates a correction command based on the information acquired in steps S105, S108, or S109 and outputs the correction command to the liquid-discharge head units 210. When the operation in step S111 is completed, the present control process ends.

As a result of the discharge-timing correction control illustrated in the flowchart of FIG. 6, the correction of the timing of discharge from the liquid-discharge head units 210 onto the web 120 (recording medium) currently set in the image forming apparatus 100 is completed. Thus, the image forming apparatus 100 is ready for printing on the web 120.

As described above, the image forming apparatus 100 according to the present embodiment includes the sheet behavior detection correction unit 523 and the inter-color alignment adjustment unit 524. The sheet behavior detection correction unit 523 detects the displacement in the conveyance direction 10 of the discharge positions on the web 120 between the liquid-discharge head units 210 depending on the type of the web 120. Based on the result of detection of the displacement, the sheet behavior detection correction unit 523 performs the sheet behavior detection correction to correct the timing of discharge from the liquid-discharge head units 210 to keep the discharge positions of the liquid-discharge head units 210 stable regardless of the type of the web 120. After the sheet behavior detection correction is performed, the inter-color alignment adjustment unit 524 performs the inter-color alignment adjustment to correct the timing of discharge from the liquid-discharge head units 210 to align the discharge positions of the liquid-discharge head units 210. The inter-color alignment adjustment unit 524 does not perform the inter-color alignment adjustment in a case where the inter-color alignment adjustment has been completed on the web 120 of another type in the past.

With this configuration, applying the correction of the timing of discharge based on the sheet behavior detection (i.e., the sheet behavior detection correction as the first correction) at the time of the alignment adjustment eliminates the need to repeat "the correction between different colors affected by the elongation and contraction of the sheet" (i.e., the inter-color alignment adjustment as the second correction). Since the inter-color alignment adjustment can be omitted when different types of recording media are used, the time taken for the alignment adjustment can be shortened. In other words, the time taken for the processes can be shortened. As a result, the image forming apparatus 100 according to the present embodiment can enhance productivity when different types of recording media are used for printing.

The image forming apparatus 100 according to the present embodiment further includes the adjustment result storing unit 525 that stores the result of the inter-color alignment adjustment performed by the inter-color alignment adjustment unit 524. In a case where the result of adjustment is stored in the adjustment result storing unit 525, the inter-color alignment adjustment unit 524 uses the result of adjustment instead of performing the inter-color alignment adjustment.

Such a configuration allows quick determination as to whether the inter-color alignment adjustment has been performed, thus further enhancing productivity.

Head Malfunction Determination Control

In the present embodiment, the controller 520 can determine whether one or more heads of the liquid-discharge head units 210 malfunction, by using the printed matter after the discharge-timing correction control described above is performed. As illustrated in FIG. 3, the controller 520 further includes a head malfunction determination unit 526 as a function (functional unit) related to head malfunction determination control.

The head malfunction determination unit 526 determines whether one or more heads of the liquid-discharge head units 210 malfunction based on an image read by the scanner 53 after the first correction (the sheet behavior detection correction) and the second correction (the inter-color alignment adjustment) are performed. Based on the determination that the one or more heads malfunction, the head malfunction determination unit 526 notifies a user of the malfunction via, for example, a notifier 140 disposed in the image forming apparatus 100.

Figure 7:
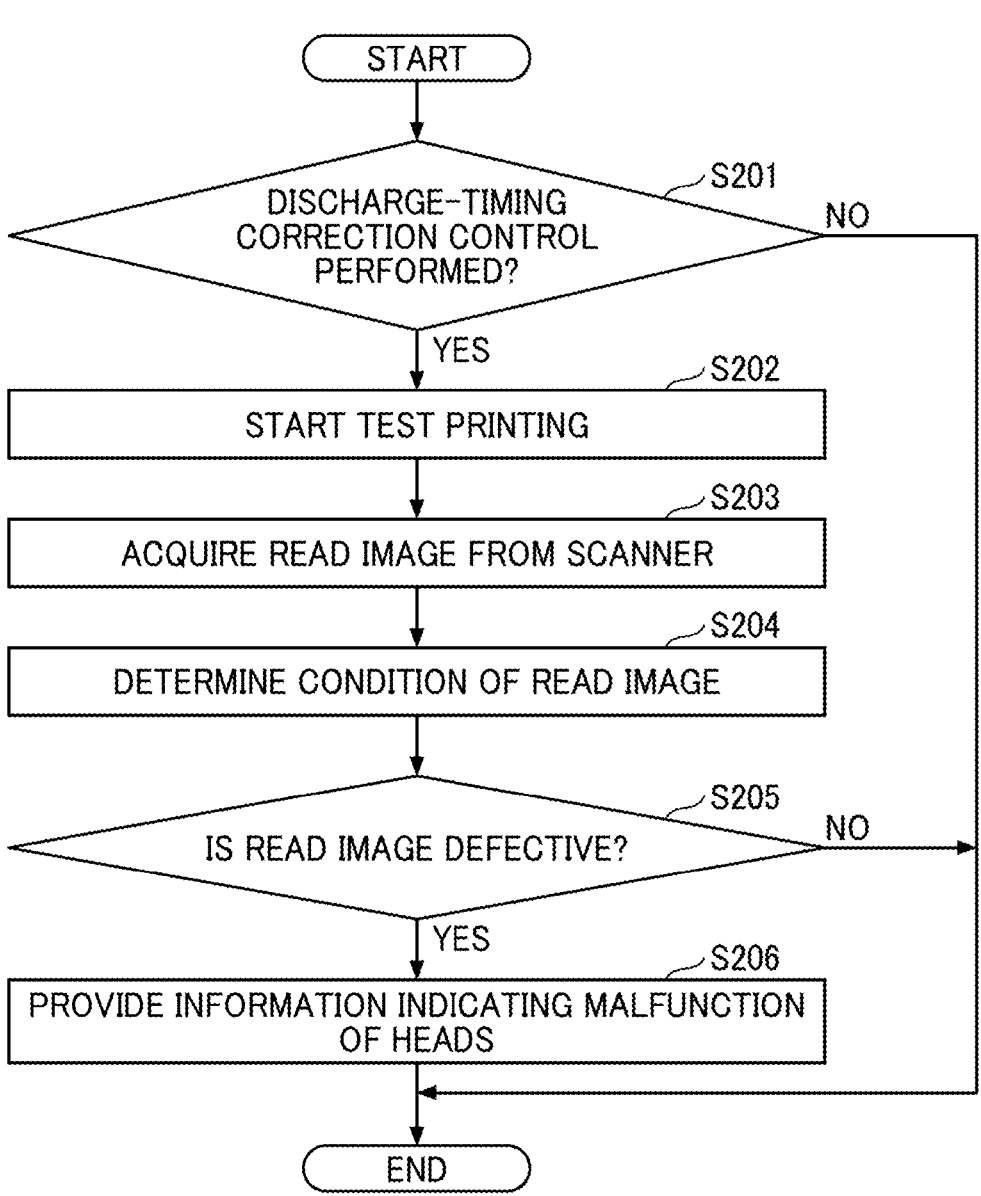
FIG. 7 is a flowchart of a head malfunction determination control according to an embodiment of the present disclosure.

FIG. 7 is a flowchart of the head malfunction determination control according to the present embodiment.

In step S201, the head malfunction determination unit 526 determines whether the discharge-timing correction control described above with reference to FIG. 6 has been performed. When the discharge-timing correction control has been performed (YES in step S201), the process proceeds to step S202. By contrast, when the discharge-timing correction control has not been performed (NO in step S201), the present control process ends.

In step S202, the head malfunction determination unit 526 outputs a command related to the head malfunction determination control to the discharge control unit 521 and the discharge control unit 521 starts test printing for the head malfunction determination control. Specifically, the discharge control unit 521 uses, for example, data of a control command for test printing that the discharge control unit 521 stores in advance, to output the control command to the liquid-discharge head units 210.

In step S203, the scanner 53 reads a test print image formed on the web 120 by the liquid-discharge head units 210, thus acquiring a read test print image. The scanner 53 outputs the information of the acquired read image to the head malfunction determination unit 526. In other words, the head malfunction determination unit 526 acquires the read image from the scanner 53.

In step S204, the head malfunction determination unit 526 determines the condition of the read image. As a method of determination, for example, the head malfunction determination unit 526 compares the read image acquired in step S203 with a sample image that the head malfunction determination unit 526 stores in advance as a sample of an evaluation reference, which is specifically the information of the test print image formed by the heads of the liquid-discharge head units 210 under normal conditions. For example, when there is a difference equal to or greater than a predetermined threshold between the read image and the sample image, the head malfunction determination unit 526 determines that the read image is defective. The difference between the read image and the sample image includes, for example, misalignment or a lack of a plurality of dots in the image. The malfunction of the one or more heads determined in this step includes, for example, the bending of the nozzles of each head and the clogging of the nozzles.

In step S205, the head malfunction determination unit 526 determines whether the read image is defective. When the read image is defective (YES in step S205), the process proceeds to step S206. In step S206, the head malfunction determination unit 526 outputs a command to the notifier 140 and the notifier 140 provides information indicating the malfunction of the one or more heads. As a method of notification, for example, the notifier 140 outputs an alarm sound or a voice, displays a warning message on an operation panel of the image forming apparatus 100, or turns on an alarm lamp. When the operation in step S206 is completed, the present control process ends.

By contrast, when the read image is not defective (NO in step S205), the present control process ends. At this time, the notifier 140 may provide information indicating that the heads are under normal conditions.

As described above, the image forming apparatus 100 according to the present embodiment includes the scanner 53 and the head malfunction determination unit 526. The scanner 53 is disposed downstream from the liquid-discharge head units 210 in the conveyance direction 10 to read an image formed on the web 120 by the discharger 110. The head malfunction determination unit 526 determines whether one or more heads of the liquid-discharge head units 210 malfunction based on the image read by the scanner 53 after the sheet behavior detection correction and the inter-color alignment adjustment are performed.

Such a configuration allows the determination as to whether one or more of the liquid-discharge head units 210 malfunction based on the result of correction by the discharge-timing correction control, thus enhancing the convenience of the image forming apparatus 100.

According to one or more aspects of the present disclosure, productivity can be enhanced when different types of recording media are used for printing.

The present embodiment has been described above with reference to specific examples. However, the present disclosure is not limited to these specific examples. These specific examples to which appropriate design modifications are added by those skilled in the art are also included in the scope of the present disclosure as long as the features of the present disclosure are included. Each element included in each specific example described above and the arrangement, condition, shape, and the like thereof are not limited to those illustrated and may be changed as appropriate. The elements included in the specific examples described above may be combined as appropriate as long as there is no technical contradiction.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application-specific integrated circuits (ASICs), field-programmable gate arrays (FPGAs), and/or combinations thereof which are configured or programmed, using one or more programs stored in one or more memories, to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

There is a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium such as a CD-ROM or DVD, and/or the memory of an FPGA or ASIC.

The invention claimed is:

1. An image forming apparatus comprising:
a discharger including a plurality of liquid-discharge head units to discharge liquid to form an image on a recording medium conveyed in a direction; and
circuitry configured to:
    detect displacement in the direction of discharge positions on the recording medium between the plurality of liquid-discharge head units depending on a type of the recording medium;
    perform, based on a result of detection of the displacement, a first correction to correct timing of discharge from the plurality of liquid-discharge head units to keep the discharge positions of the plurality of liquid-discharge head units stable regardless of the type of the recording medium; and
    perform, after the first correction, a second correction to correct the timing of discharge from the plurality of liquid-discharge head units to align the discharge positions of the plurality of liquid-discharge head units, unless the second correction has been completed on the recording medium of another type in past.

2. The image forming apparatus according to claim 1, further comprising a memory that stores a result of the second correction having been completed in the past,
wherein the circuitry is configured to use the result of the second correction, instead of performing the second correction.

3. The image forming apparatus according to claim 1, further comprising a scanner downstream from the plurality of liquid-discharge head units in the direction, the scanner being configured to read the image formed on the recording medium by the discharger,
wherein the circuitry is further configured to determine whether one or more of the plurality of liquid-discharge head units malfunction based on the image read by the scanner after the circuitry performs the first correction and the second correction.

4. A correcting method performed by an image forming apparatus, the image forming apparatus including a discharger including a plurality of liquid-discharge head units to discharge liquid to form an image on a recording medium conveyed in a direction, the method comprising:
    detecting displacement in the direction of discharge positions on the recording medium between the plurality of liquid-discharge head units depending on a type of the recording medium;
    performing, based on a result of detection of the displacement, a first correction to correct timing of discharge from the plurality of liquid-discharge head units to keep the discharge positions of the plurality of liquid-discharge head units stable regardless of the type of the recording medium; and
    performing, after the first correction, a second correction to correct the timing of discharge from the plurality of liquid-discharge head units to align the discharge positions of the plurality of liquid-discharge head units, unless the second correction has been completed on the recording medium of another type in past.

5. A non-transitory recording medium storing a plurality of instructions which, when executed by one or more processors of an image forming apparatus, causes the one or more processors to perform a correcting method, the image forming apparatus including a discharger including a plurality of liquid-discharge head units to discharge liquid to form an image on a recording medium conveyed in a direction, the method comprising:
    detecting displacement in the direction of discharge positions on the recording medium between the plurality of liquid-discharge head units depending on a type of the recording medium;
    performing, based on a result of detection of the displacement, a first correction to correct timing of discharge from the plurality of liquid-discharge head units to keep the discharge positions of the plurality of liquid-discharge head units stable regardless of the type of the recording medium; and
    performing, after the first correction, a second correction to correct the timing of discharge from the plurality of liquid-discharge head units to align the discharge positions of the plurality of liquid-discharge head units, unless the second correction has been completed on the recording medium of another type in past.

* * * * *